No. 677,337. Patented July 2, 1901.
M. CAMERON.
MEAT OR VEGETABLE CUTTER.
(Application filed Jan. 25, 1901.)
(No Model.) 2 Sheets—Sheet 1.
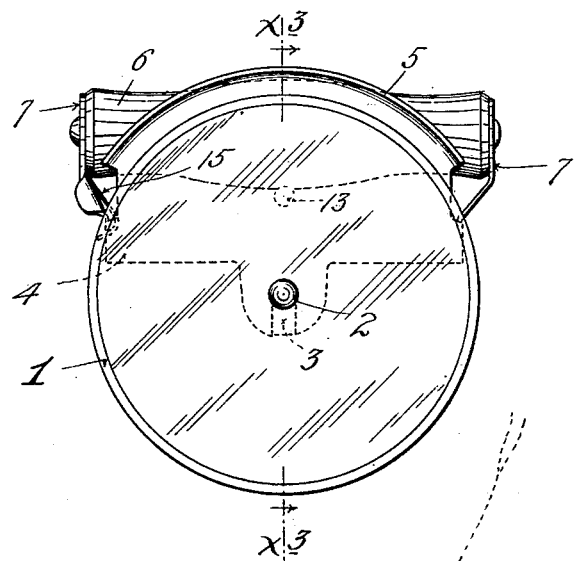
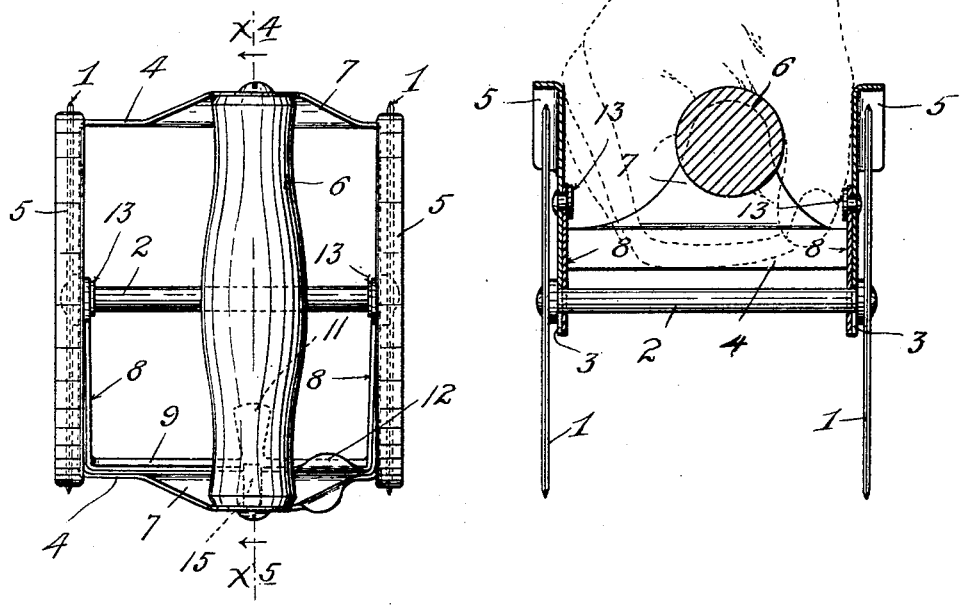
Witnesses.
Harry Kilgord,
Mabel M. McGrory
Inventor.
Murdick Cameron,
By his Attorneys,
Williamson & Merchant No. 677,337. Patented July 2, 1901.
M. CAMERON.
MEAT OR VEGETABLE CUTTER.
(Application filed Jan. 25, 1901.)
(No Model.) 2 Sheets—Sheet 2.

Witnesses,
Harry Kilgore,
Mabel M. McElroy

Inventor,
Murdick Cameron,
By his Attorneys,
Williamson & Merchant

UNITED STATES PATENT OFFICE.

MURDICK CAMERON, OF DULUTH, MINNESOTA.

MEAT OR VEGETABLE CUTTER.

SPECIFICATION forming part of Letters Patent No. 677,337, dated July 2, 1901.

Application filed January 25, 1901. Serial No. 44,659. (No model.)

*To all whom it may concern:*

Be it known that I, MURDICK CAMERON, a citizen of the United States, residing at Duluth, in the county of St. Louis and State of Minnesota, have invented certain new and useful Improvements in Meat or Vegetable Cutters; and I do hereby declare the following to be a full, clear, and exact description of the invention, such as will enable others skilled in the art to which it appertains to make and use the same.

My present invention has for its object to provide an improved meat and vegetable cutter especially adapted for domestic use to take the place of an ordinary chopping-knife.

To the above ends the invention consists of the novel devices and combinations of devices hereinafter described, and defined in the claims.

The invention is illustrated in the accompanying drawings, wherein like characters indicate like parts throughout the several views.

Figure 4:
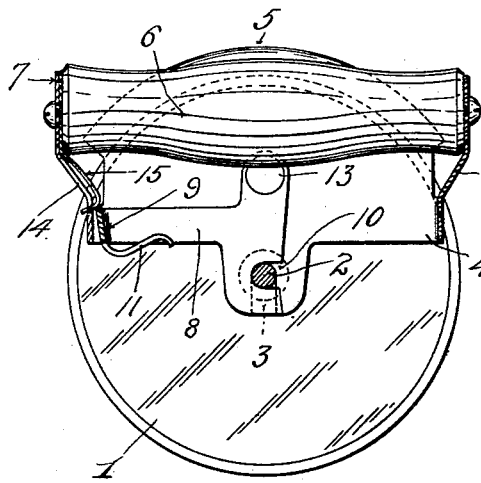
Figure 5:
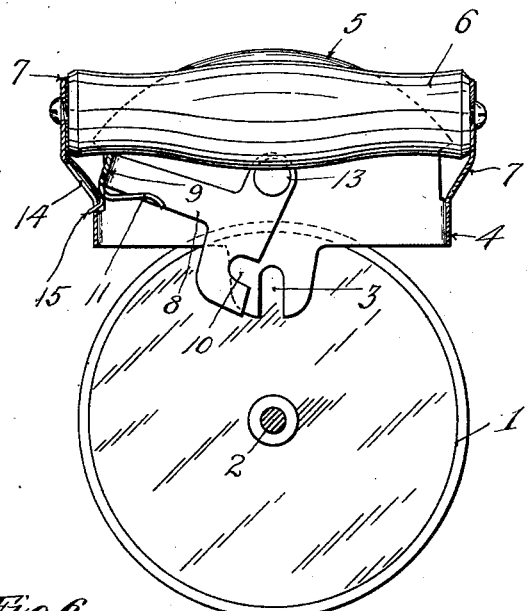

Figure 1 is a view in side elevation showing my improved cutter. Fig. 2 is a plan view of said cutter. Fig. 3 is a transverse vertical section taken on the line $x^3 x^3$ of Fig. 1. Figs. 4 and 5 are longitudinal vertical sections taken approximately on the line $x^4 x^5$ of Fig. 2, the former showing the parts in operative position and the latter showing them separated; and Fig. 6 is a perspective view of the axle latch-bracket removed from working position.

The cutters 1 are in the form of sharp-edged disks or wheels, preferably of tempered steel, secured on an axle 2. The axle 2 fits in open seats 3, formed in the sides of a rectangular frame 4. The cutters when placed in working position embrace the sides of the said frame 4, and the said frame is provided with outturned guard-flanges 5, which overlie and follow the upper edges of the cutters and protect the hand therefrom. The handpiece 6 extends above the axle 2 and at a right angle to the axis thereof, and it is secured at its ends to ears 7, formed on the ends of the frame 4.

Figure 6:
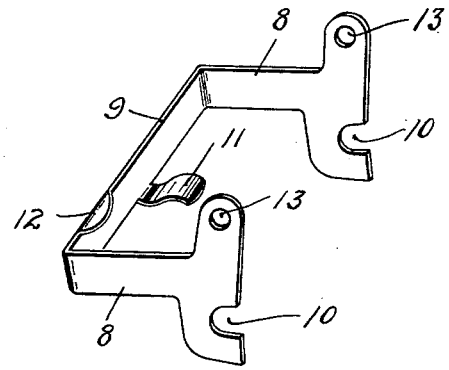

The so-called "axle-latch" is best illustrated in Fig. 6 and, as therein shown, is afforded by a pair of latch-plates 8, connected by a cross-bar 9, and provided with open seats 10. The bar 9 is provided with an inwardly-projecting finger-piece 11 and, as shown, is also provided with a thumb-piece 12. This latch fits within the rectangular frame 4 and is pivoted to the sides thereof at 13. The open seats 10 extend transversely of the open seats 3 and coöperate therewith to detachably secure the axle in working position with freedom for rotation.

On the forward end of the frame 4, with its free end working through a slot 14 in said frame, is a lock-spring 15, which engages the forward end of bar portion 9 of the axle-latch and serves to hold the same either in its operative position, as shown in Fig. 4, or in its inoperative position, as shown in Fig. 5. This spring-latch 14 may, however, be overcome by force applied to the finger-piece 11 or to the thumb-piece 12.

The latch-piece above described engages the axle at two different points in the vicinity of its disks, and a common movement simultaneously moves both of the latch-plates 8 thereof either into or out of their operative positions, according to the direction of movement.

In experiments with these cutters I found it to be essential to the best results that the handpiece be extended transversely of the axle and as close as possible to the axle and at the same time that the cutting-disks be located as closely together as possible with the other desirable features attained. Hence I have located the handle below the tops of the cutting-disks 1 and only so far away from the axle as is necessary to give clearance for the fingers which grip the handpiece, and have further located the said handpiece closer to one of the cutting-disks than to the other, so as to give room on the one side for the knuckles and on the other side for the thumb. This latter feature brings the cutting-disks as closely together as is possible with the handle located close to the axle.

It will be understood that the device above described is capable of considerable modification within the scope of my invention. It will be further understood that it is necessary or exceedingly desirable to remove the connected cutters and axle for the purpose of sharpening and cleaning said cutter.

What I claim, and desire to secure by Letters Patent of the United States, is as follows:

1. The combination with a frame, having a pair of open seats and a handpiece, of an axle fitting in said open seats and provided at its ends with cutting-disks, and an axle-latch pivoted to said frame, and provided with a pair of laterally-spaced plates or members having open seats that extend transversely of the open seats of said frame and coöperate therewith to simultaneously connect said axle in working position and vice versa, substantially as described.

2. A cutter of the character described, comprising a frame, a pair of cutting-disks, guards on said frame overlying said cutters, and a handpiece on said frame extending transversely of and above the axis of said cutters, but located below said guards and the upper edges of said cutters, substantially as described.

3. The combination with the frame 4 having the guards 5, of the pair of cutting-disks 1 having the axle 2 mounted in said frame and the handpiece 6 secured to said frame, which handpiece extends transversely of said axle 2, below said guards 5, and nearer to one of said guards and cutters than to the others, substantially as and for the purposes set forth.

In testimony whereof I affix my signature in presence of two witnesses.

MURDICK CAMERON.

Witnesses:
P. GEO. HANSON,
W. MARQUARDT.